US006617959B1

(12) United States Patent
Kuo

(10) Patent No.: US 6,617,959 B1
(45) Date of Patent: Sep. 9, 2003

(54) NON-CONTACT CHIP LOCK AND BATTERY-FREE KEY THEREOF

(76) Inventor: Mei-Chin Kuo, 2F., No. 90-1, Fushing Rd., Shindian City, Taipei (TW)

( * ) Notice: Subject to any disclaimer, the term of this patent is extended or adjusted under 35 U.S.C. 154(b) by 0 days.

(21) Appl. No.: 09/675,562

(22) Filed: Sep. 29, 2000

(51) Int. Cl.[7] .............................................. G05B 19/00

(52) U.S. Cl. ..................... 340/5.61; 340/10.1; 307/10.3

(58) Field of Search ............................... 340/5.61, 5.62, 340/10.1, 10.3, 10.5, 10.33; 307/10.3

(56) References Cited

U.S. PATENT DOCUMENTS 5,539,377 A * 7/1996 Dillon ........................ 340/426
5,661,470 A * 8/1997 Karr ...................... 340/825.54
5,798,913 A * 8/1998 Tiesinga et al. .............. 363/21
6,072,383 A * 6/2000 Gallagher et al. ......... 340/10.2
6,400,255 B1 * 6/2002 Ohnishi et al. ............ 340/5.62

FOREIGN PATENT DOCUMENTS

JP Heisei 7-324533 * 12/1995 ............ H04Q/9/00

* cited by examiner

*Primary Examiner*—Michael Horabik
*Assistant Examiner*—M Shimizu

(57) ABSTRACT

A non-contact chip lock and a battery-free key for unlocking the lock are provided. When the insertion portion of the key is inserted into the cylindrical body of the lock, the inductive choke in the key is induced by the magnetic field generated by the transmitting coil unit in the lock and together with the transmitting coil unit to form a flyback transformer. The induced inductive choke generates induced current that enables normal operation of the key without any battery, and bi-directional transmission of encrypted data between the key and the lock.

6 Claims, 4 Drawing Sheets

NON-CONTACT CHIP LOCK AND BATTERY-FREE KEY THEREOF

BACKGROUND OF THE INVENTION

The present invention relates to a lock, and more particularly to a non-contact chip lock being internally provided with a transmitting coil unit and to a key thereof being internally provided with an inductive choke. When the key is inserted into the lock, the inductive choke is induced by a magnetic field generated by the transmitting coil unit to produce electricity needed by the key to operate normally and to modulate and demodulate specially signals, such that the key is battery-free and encrypted data may be bi-directionally transmitted between the lock and the key.

It is a common practice for people to ensure the safety of their life and property by means of locks. Most of the conventional locks include mechanical-type lock barrel and key. For experienced thefts, such mechanical locks can be unlocked within one or two minutes. This can be evidenced by the quick unlocking of a lock by a locksmith. This undesirable fact is a great threat to people's life and property. To improve the conventional mechanical-type locks, there are various kinds of electronic locks developed and available in the markets, including IC card lock, magnetic card lock, encrypted lock, wireless remote-controlled lock, etc. Such electronic locks are expensive and have big volume and are therefore inconvenient for carry. Some of these electronic locks need to replace batteries frequently and/or be isolated from magnetic articles. Users of such electronic locks would inevitably worry that the preset encrypted codes for the locks are illegally copied or decoded. All these factors prevent the electronic locks from being widely accepted by the public to replace the conventional mechanical locks.

The above-mention drawbacks of the conventional locks, either mechanical or electronic type, can be summarized as follows:

1. The conventional mechanical-type locks tend to be easily unlocked by those familiar with such skills.
2. The IC card and the magnetic card are provided with metal contacts or inducing magnetic strips which are possibly purposefully destructed by applying a wrong voltage or current to the metal contacts or demagnetizing the magnetic strips, so as to illegally unlock or damage the locks.
3. The encrypted codes for the encrypted lock are possibly detected by purposefully peeping at the lock when the same is being unlocked, or by observing keys on the lock having the sign of being frequently depressed.
4. The wireless remote-controlled lock needs frequent inspections and replacements of batteries. And, the encrypted signals emitted via radio waves are possibly purposefully copied by someone else in an attempt to decode and unlock the lock.

It is therefore tried by the inventor to develop a non-contact chip lock and a battery-free key thereof to eliminate the drawbacks existing in the conventional mechanical and electronic locks.

SUMMARY OF THE INVENTION

A primary object of the present invention is to provide a non-contact chip lock and a battery-free key thereof, wherein the key does not need any battery to supply electricity needed by it to operate normally and allows bi-directional transmission of encrypted data between the key and the lock.

Another object of the present invention is to provide a non-contact chip lock and a battery-free key thereof, wherein the key is non-directional relative to the lock and allows easy insertion of it into the lock without the need of turning it to any specific position in the lock.

To achieve the above and other objects, the non-contact chip lock of the present invention is provided with an internal circuit composed of a microcontroller, a comparator, a transmitting coil unit, a position switch, and an unlocking unit, and the key thereof is provided with an internal circuit composed of a microprocessor, a residual magnetism eraser, an inductive choke, a rectifying and stabilizing unit, and an electric pulse counting unit. When the key is inserted into the lock, the inductive choke in the key is induced by a magnetic field generated by the transmitting coil unit in the lock and together with the transmitting coil unit forms a flyback transformer. The induced inductive choke generates electricity needed by the key to operate normally, and no battery is needed by the key. With the induced current generated by the inductive choke in the key, encrypted data may be bi-directionally transmitted between the key and the lock, and the key could be easily inserted into the lock without the need of turning the key to a specific position in the lock.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 3:
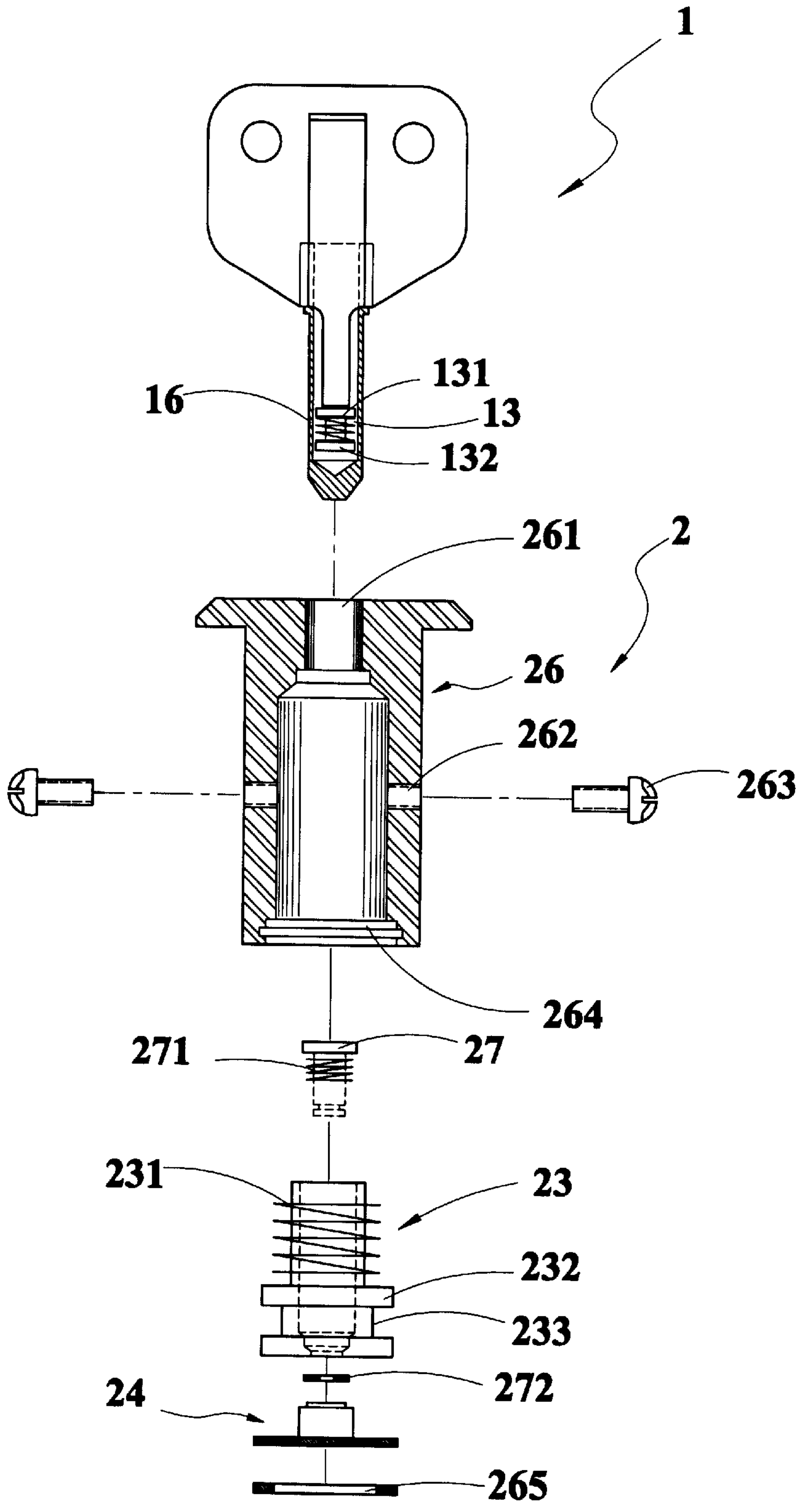
FIG. 3 is an exploded and partially sectioned view of the key and lock of the present invention to show the internal structure thereof.
Figure 4:
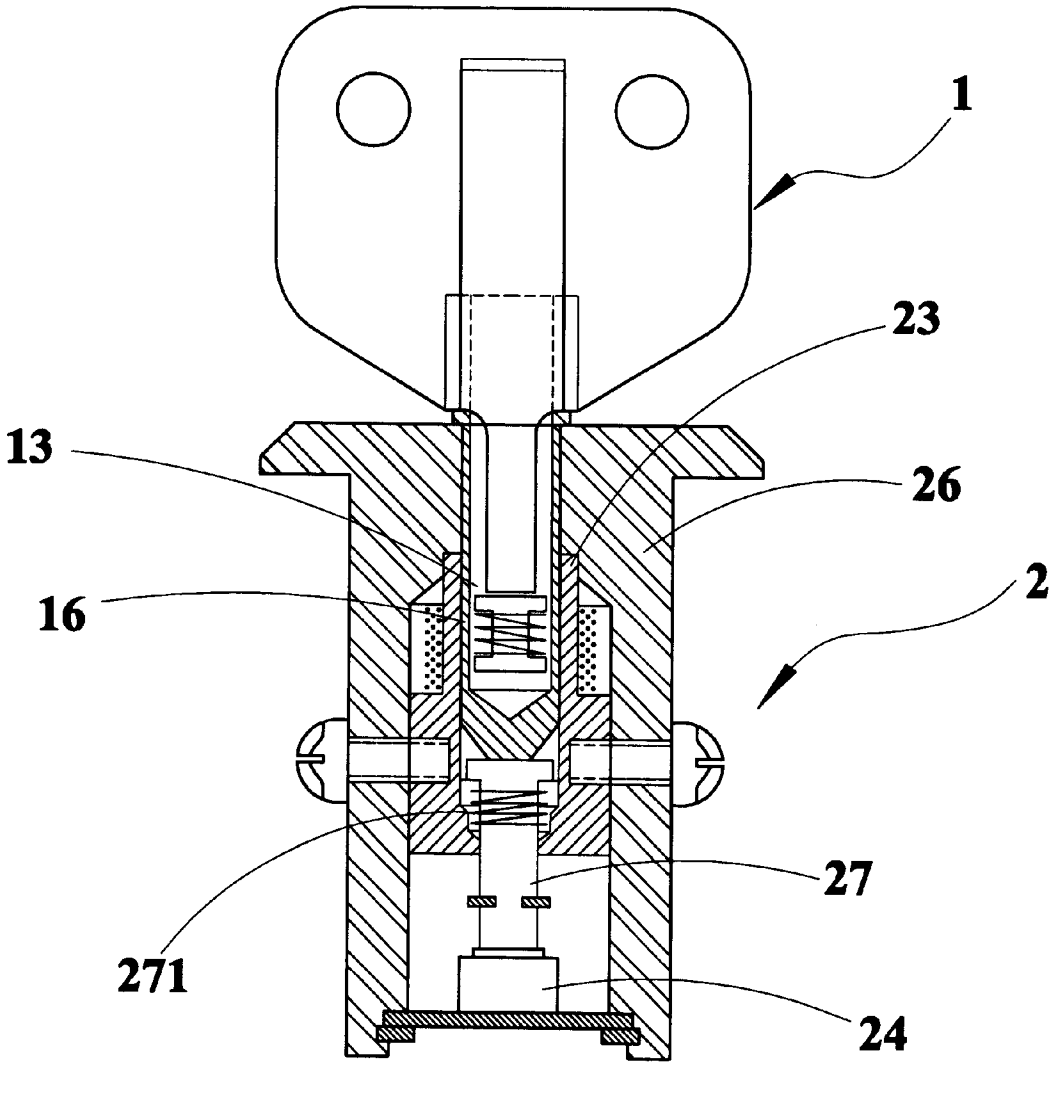
FIG. 4 is an assembled and partially sectioned view of the key and lock of the present invention.

The present invention relates to a lock 2 and a key 1 thereof. FIGS. 3 and 4 are partially sectioned views of the lock 2 and the key 1 in disassembled and assembled states, respectively, to show internal structures thereof and the manner in which the lock 2 and the key 1 interact with each other.

Figure 1:
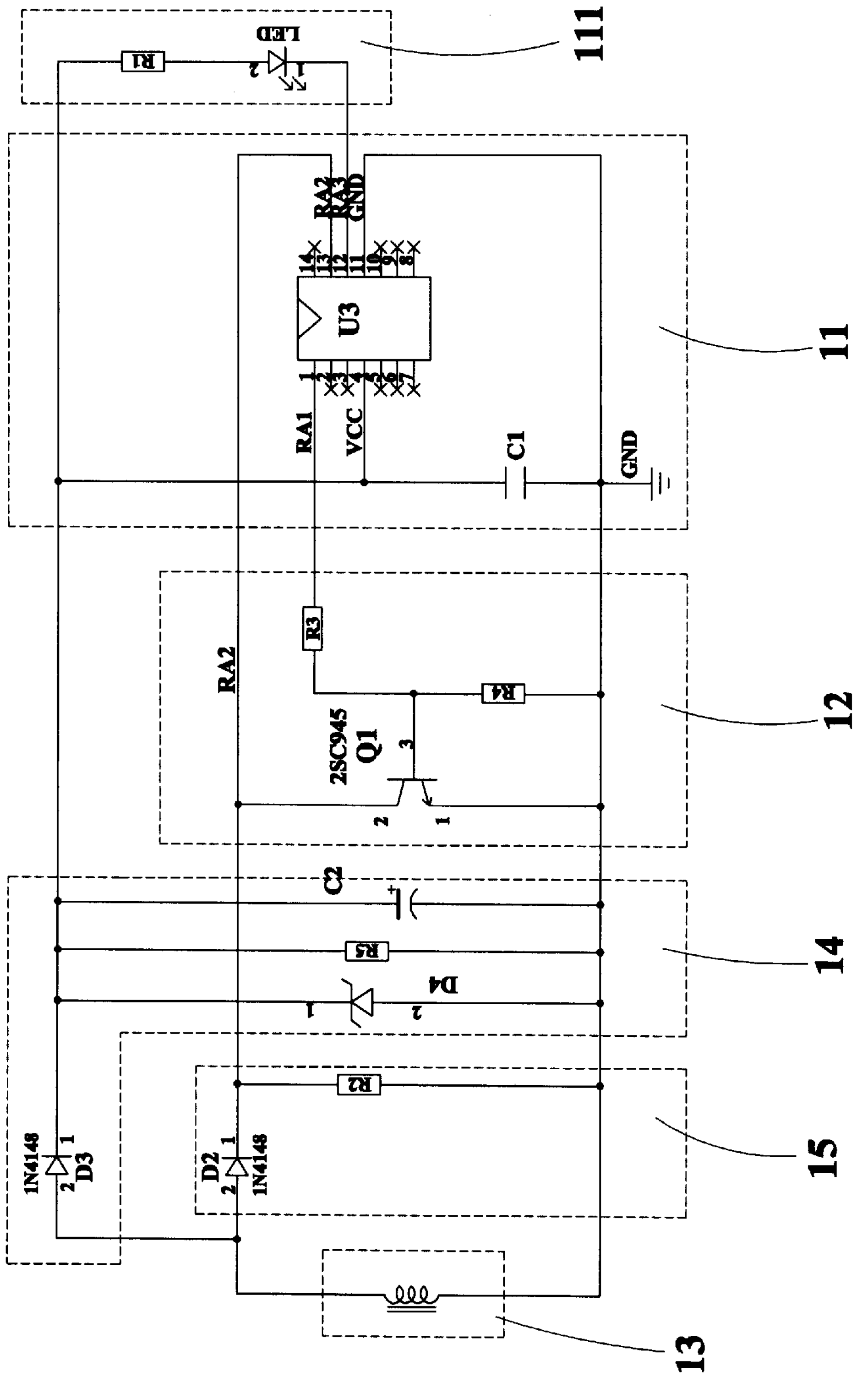
FIG. 1 is a circuit diagram of the circuit in the key of the present invention.

Please now refer to FIG. 1 that is a circuit diagram showing a circuit inside the key 1 of the present invention. As shown, the circuit in the key 1 mainly includes a microprocessor ll, a residual magnetism eraser 12, an inductive choke 13, a rectifying and stabilizing unit 14, and an electric pulse counting unit 15.

The microprocessor 11 controls transmission of encrypted data. The data to be transmitted are encoded depending on usage and type of lock working with the key 1. A light emitting diode (LED) 111 may be mounted between the microprocessor 11 and the inductive choke 13. When the key 1 operates normally, the LED 111 flashes once to inform a user the key 1 is operating in a normal condition.

The residual magnetism eraser 12 is capable of erasing any residual magnetism on the inductive choke 13.

The inductive choke 13 includes a highly magnetically conductive core 132 around which a coil 131 is wound. When the inductive choke 13 is induced, it generates an amount of electric current to enable transmission of modulated and demodulated encrypted data.

The rectifying and stabilizing unit 14 rectifies the induced electric current generated by the inductive choke 13 and stabilizes the voltage of the induced current, so that a current about 3 mA of 3.5V is produced and supplied to the microprocessor 11 for the same to maintain normal operation thereof.

The electric pulse counting unit 15 works to continually count electric pulses sent from the key 1 to the lock 2 as well as electric pulses sent from the lock 2 to the key 1. Whenever the counting unit 15 counts n pulses, it pauses a short time in order to represent 0 and 1 forming the encrypted data.

When the microprocessor 11 is replaced with a chip having the IC card management ability, the key 1 may replace the current IC card and be used to actuate automatic cashier and depositor systems, just like a withdrawal card or cash card issued by banks.

Figure 2:
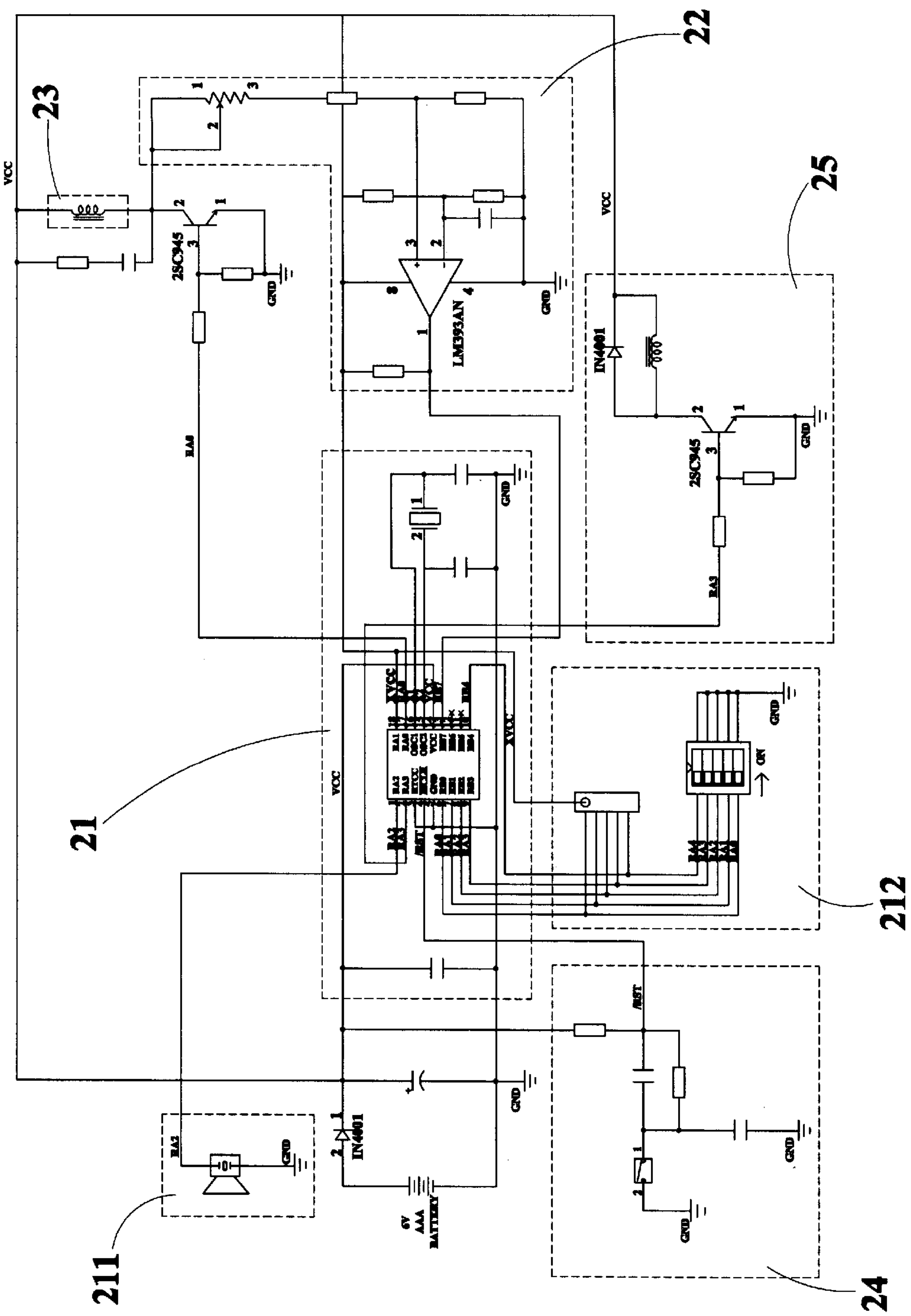
FIG. 2 is a circuit diagram of the circuit in the lock of the present invention.

FIG. 2 is a circuit diagram showing a circuit inside the lock 2 of the present invention. As shown, the circuit in the lock 2 mainly includes a microcontroller 21, a comparator 22, a transmitting coil unit 23, a position switch 24, and an unlocking unit 25.

The microcontroller 21 is capable of generating square waves of 50 KHz and having an ON/OFF cycle at the ratio of 3:1. The square waves are sent to the transmitting coil unit 23. The microcontroller 21 receives the encrypted data sent out by the inductive choke 13 of the key 1 and compares the received encrypted data with encrypted data stored in the lock 2. A buzzer 211 and a fingertip switch 212 are connected to the microcontroller 21. The buzzer 211 buzzes once, when the lock 2 is successfully unlocked, and three times when the lock 2 could not be unlocked. The fingertip switch 212 is used to set some values, such as change or stop using a certain key.

The comparator 22 is capable of detecting residual magnetism on the highly magnetically conductive core 132 of the inductive chock 13 in the key 1. When the coil 131 wound around the core 132 is no longer energized for a predetermined fixed time period, the comparator 22 would compare a voltage level of the coil 131 with that of the comparator 22. From a voltage level of the coil 131 higher or lower than that of the comparator, messages sent by the key 1 can be read out.

The transmitting coil unit 23 includes a coil 231 wound around a non-magnetically conductive cylindrical tube 232. When the transmitting coil unit 23 receives the cyclic square waves sent by the microcontroller 21, the coil 231 is energized to generate an alternating magnetic field that induces the inductive choke 13 of the key 1 to produce induced current.

When the position switch 24 is actuated, it generates a reset signal that is sent to the microcontroller 21 to inform the latter to operate.

The unlocking unit 25 receives an unlocking signal from the microcontroller 21 to unlock the lock 2 when the microcontroller 21 has compared and found the encrypted data sent by the key 1 is compatible with that stored in the lock 2.

The buzzer 211 provided in the lock 2 may also be set to function as an alarm, such that when an incorrect key is inserted into the lock 2, the buzzer 211 would immediately emit high dB sound to effectively deter an intruder.

Power supply needed by the lock 2 may be supplied with a 6V battery or direct current converted from city electricity. In normal condition, the microcontroller 21 in the lock 2 will turn off the current sent to the inductive coil unit 23 so that the lock 2 enters into a power-saving sleep mode and consumes power less than 10 $\mu$A. When the key 1 is inserted into the lock 2, the lock 2 would consume higher power for a very short time and then quickly enters into the sleep mode again. This feature allows the lock 2 of the present invention to be used in an environment without external power supply and be powered only by the battery for a prolonged time.

FIGS. 3 and 4 are partially sectioned views of the key 1 and the lock 2 in disassembled and assembled states, respectively, to show their internal structures and the structural relation between them.

The key 1 and the lock 2 are made of non-magnetically conductive material, such as a high-rigidity plastic material, for instance, ABS plastics, or stainless steel material, and have sizes the same as that of general keys and locks.

The key 1 includes an insertion portion 16 in which the inductive choke 13 is provided to supply electricity for the key 1 to operate normally and to send out encrypted data stored in the key 1.

The lock 2 mainly includes a cylindrical tube 26 as its main body. The cylindrical tube 26 defines an inner space therein and is provided at a rear end with an internal thread 264, at two diametrically opposite sides with two symmetrical screw holes 262 into which screws 263 may be tightened, and at a front end with a key hole 261 into which the insertion portion 16 of the key 1 maybe inserted.

The transmitting coil unit 23 is located in the inner space defined by the cylindrical tube 26. The cylindrical tube 231 of the transmitting coil unit 23 is provided around a rear portion with an annular recess 233. When the transmitting coil unit 23 is correctly mounted in the cylindrical tube 26, the annular recess 233 is aligned with the two screw holes 262 on the cylindrical tube 26, allowing the screws 263 to thread through the screw holes 262 into the annular recess 233 and thereby fix the cylindrical tube 231 in place in the cylindrical tube 26. The transmitting coil unit 23 further includes a generally T-shaped positioning link 27 positioned in the cylindrical tube 231 with a longitudinal body of the link 27 elastically projected from a rear open end of the cylindrical tube 231. A spring 271 is put around the longitudinal body of the link 27 between a transverse head portion of the link 27 and the rear open end of the cylindrical tube 231 to normally elastically push the link 27 forward. A stopping plate 272 is engaged with an annular groove provided around a rear end of the longitudinal body of the link 27 outside the rear open end of the cylindrical tube 231, such that when the link 27 is pushed forward by the spring 271, the stopping plate 272 would be brought to press against the rear open end of the cylindrical tube 231 and thereby stops the link 27 from completely retracting into the cylindrical tube 231. The link 27 in this partially retracted position can be pushed rearward to project the longitudinal body thereof from the rear open end of the cylindrical tube 231 whenever the key 1 is inserted into the lock 2.

The position switch 24 is enclosed in a rear part of the cylindrical tube 26 behind the link 27 by screwing a bottom cap 265 to the cylindrical tube 26 via the internal thread 264.

When the insertion portion 16 of the key 1 is fully inserted into the key hole 261 of the lock 2, the inductive choke 13 in the key 1 is surrounded by the coil 231 of the transmitting coil unit 23 in the lock 2. The inductive choke 13 and the transmitting coil unit 23 induce each other and together form a flyback transformer. A front end of the insertion portion 11 of the key 1 in the lock 2 also touches the transverse head of the positioning link 27 and pushes the same backward to actuate the position switch 24, so that the transmitting coil unit 23 generates an alternating magnetic field. The inductive choke 13 in the key 1 is induced by the alternating magnetic field to generate a current that is rectified and stabilized to provide an output of current about 3 mA of 3.5V. At this point, data may be bi-directionally transmitted between the inductive choke 13 and the transmitting coil unit 23.

The data is bi-directionally transmitted between the inductive choke 13 and the transmitting coil unit 23 based on the following principle:

When the data is transmitted from the lock 2 to the key 1 via the current, pulse of the transmitting current is caused to pause by:a very short time about 60 μs whenever the number of pulses sent out reaches N (for example, N=10), in order to represent a "0" or a "1" forming the data. And, the pulse is also caused to pause by a very short time about 60 μs whenever the number of pulses sent out reaches N+M, where M≧1, in order to represent a "1" or a "0" forming the data. When M=1, N+M represents "0", and when M=0, N+M represents "1". Alternatively, when M=1, N+M represents "1", and when M=0, N+M represents "0". The electric pulse counting unit 15 in the key 1 continually counts the pulses based on the above-described principle and the data that should be fed back by the key 1 to the lock 2 can therefore be determined. Generally, the value of N should not be too small, lest there should be a very low transmission/pause ratio to result in undesired stop of electric supply to the key 1. A value of 10 for N would be adequate and a value for M is usually 1. Whenever there is an additional pulse counted, it would represent a different digital logic.

On the other hand, whenever there are data transmitted from the key 1 to the lock 2, the lock 2 will regularly cause the current pulses to pauses by a very short time whenever N electric pulses have been sent out. The lock 2 also counts the pulses sent by it when the key 1 sends data to the lock 2. When the $(N-1)^{th}$ pulse is counted, the key 1 decides whether the residual magnetism eraser 12 should be actuated or not based on the above-mentioned data that is to be fed back to the lock 2. In the case the residual magnetism eraser 12 is not actuated, the flyback transformer is no longer energized. However, there is still residual magnetism on the highly magnetically conductive core 132. Such residual magnetism would slowly disappear and the voltage across the transmitting coil unit 23 would slowly drop. On the other hand, when the residual magnetism eraser 12 is actuated, the residual magnetism on the core 132 would be quickly erased and the voltage across the transmitting coil unit 23 would drop fast. Based on the different speeds at which the residual magnetism disappears, the comparator 22 detects and compares the difference in voltage level between it and the coil 131 of the inductive choke 13 and thereby reads out the data sent by the key 1.

With the above arrangements, the key 1 does not need any battery to supply electricity needed by it to operate normally and the encrypted data may be bi-directionally transmitted between the key 1 and the lock 2. Moreover, the above arrangements allows the key 1 to be non-directional relative to the lock 2 and may be easily inserted into the lock 2 without the need of turning it to any specific position in the lock 2. The lock 2 and the key 1 could therefore be used in a very simple manner.

The following are some of the advantages of the lock 2 and the key 1 according to the present invention:

1. A specific electronic encrypted circuit is enclosed in the key made of high-rigidity plastics or stainless steel and having shape and size similar to that of general keys. The key is watertight, vibration proof and easy for use.
2. The key 1 is non-directional relative to the lock 2 and may be easily inserted into the lock 2 without the need of turning the key 1 to any specific position in the lock 2. Moreover, the lock 2 and the key 1 allow transmission of encrypted data through pulses within a very close distance without the risk of being interfered by external environment.
3. Coils are provided in the key and the lock to generate magnetic field and induced current. Therefore, the circuit in the key 1 is able to work without the need of any battery.

In brief, the lock and the key thereof according to the present invention prevent the encrypted data thereof from being decoded or copied and are therefore highly safe for use. Moreover, the lock and the key thereof are watertight, vibration proof and durable for use, and can be easily operated.

What is claimed is:

1. A non-contact chip lock and a battery-free key thereof, said key comprising an insertion portion in which an internal circuit composed of a microprocessor, a residual magnetism eraser, an inductive choke, a current-rectifying and voltage-stabilizing unit, and an electric pulse counting unit is provided; said lock comprising a cylindrical body in which an internal circuit composed of a microcontroller, a comparator, a transmitting coil unit, a position switch, and an unlocking unit is provided; whereby when said insertion portion of said key is inserted into said cylindrical body of said lock, said inductive choke in said key is induced by a magnetic field generated by said transmitting coil unit in said lock and together with said transmitting coil unit to form a flyback transformer; and said key to operate normally without any battery and to modulate and demodulate special signals for encrypted data to be bi-directionally transmitted between said key and said lock, wherein said encrypted data is transmitted from said lock to said key through the flyback transformer so that said key reads said encrypted data and transmits a data to said lock through the flyback transformer, and wherein said comparator and said microcontroller of said lock reads and compares said data and if said data transmitted by said key is compatible with said encrypted data of said lock, said microcontroller of said lock outputs an unlocking signal to unlock said lock, while said key is non-directionally inserted into said lock without the need of turning said key to any specific position in said lock.

2. A non-contact chip lock and a battery-free key thereof as claimed in claim 1, wherein said key is made of a stainless steel material.

3. A non-contact chip lock and a battery-free key thereof as claimed in claim 1, wherein said key is made of a high-rigidity plastic material.

4. A non-contact chip lock and a battery-free key thereof as claimed in claim 1, wherein said key is provided with a light emitting diode that flashes when said lock and said key operate normally, so that a user may judge whether said lock is in a normal operating state.

5. A non-contact chip lock and a battery-free key thereof as claimed in claim 1, wherein said lock is provided with a buzzer that buzzes differently to indicate different operating conditions of said lock.

6. A non-contact chip lock and a battery-free key thereof as claimed in claim 1, wherein said lock is provided with a fingertip switch for setting values to change or stop using a certain key.

* * * * *